United States Patent [19]

West

[11] 4,420,741
[45] Dec. 13, 1983

[54] TRIM TAB POSITION MONITOR AND DISPLAY DEVICE

[76] Inventor: Donald O. West, P.O. Box 3673, Lacey, Wash. 98503

[21] Appl. No.: 297,530
[22] PCT Filed: Aug. 6, 1981
[86] PCT No.: PCT/US81/01060
  § 371 Date: Aug. 6, 1981
  § 102(e) Date: Aug. 6, 1981
[87] PCT Pub. No.: WO83/00579
  PCT Pub. Date: Feb. 17, 1983

[51] Int. Cl.³ .................. G08B 23/00; B63B 1/22
[52] U.S. Cl. .................. 340/29; 73/178 R; 114/285; 340/309.4; 440/2
[58] Field of Search ......... 340/29, 27 AT, 309.4, 340/309.5; 244/178, 194; 114/285, 286, 287; 364/434; 440/2; 73/178 R, 168

[56] References Cited

U.S. PATENT DOCUMENTS 2,723,089 11/1955 Schuck et al. .............. 244/178
3,641,965 2/1972 Schmiedel .................. 114/286
3,695,204 10/1972 Bennett .................... 114/286
3,797,449 3/1974 Carpenter et al. .......... 440/2
4,158,885 6/1979 Neuberger ................ 340/27 AT

FOREIGN PATENT DOCUMENTS 2742717 3/1979 Fed. Rep. of Germany ........ 340/29

Primary Examiner—James J. Groody
Attorney, Agent, or Firm—Cole, Jensen & Puntigam

[57] ABSTRACT

An electronic position monitor (10) and readout device (72, 90) for trim tabs on boats in which the monitor and readout device are connected to the trim tab controls. The device is electronic and position display is based on the time required for trim tab movement. Signals from the trim tab controls produce signals from timers (62, 63) which in turn are directed to enabling circuits (58, 60). If the enabling circuits pass the timer signals, they are counted in counter circuits (44, 46) and thence directed to a decoder (64) and finally to the display panel (72–90). The display panel is arranged to show the precise angular position of the trim tabs to the boat operator.

5 Claims, 3 Drawing Figures

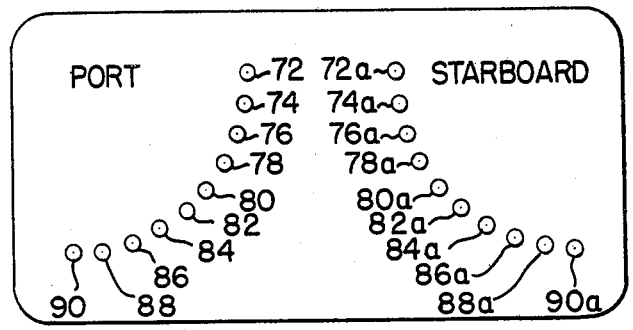
FIG. 1
FIG. 3
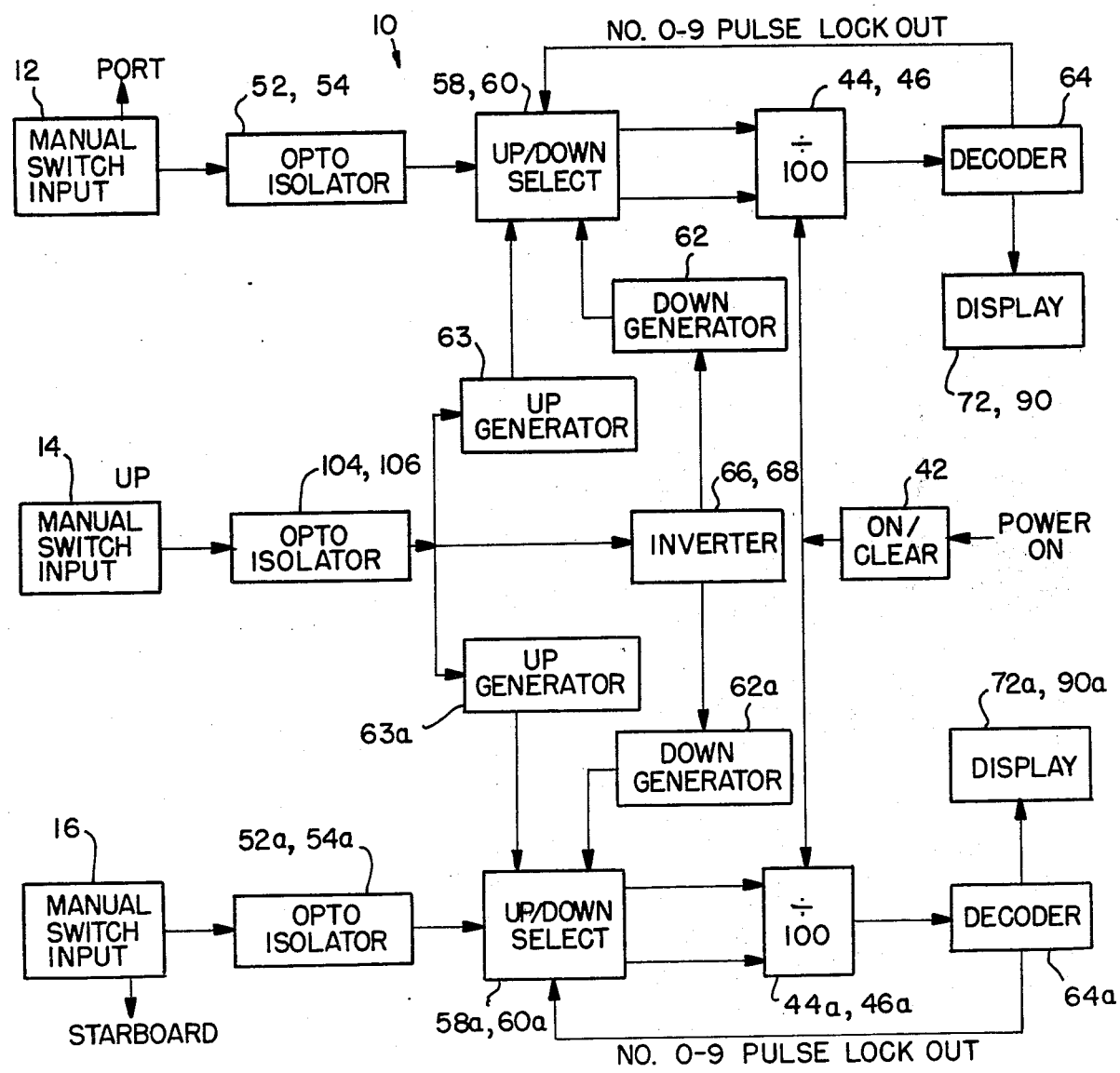

TRIM TAB POSITION MONITOR AND DISPLAY DEVICE

DESCRIPTION

1. Technical Field

The invention relates generally to the art of monitoring and displaying and more particularly does it relate to an electronic position monitoring and readout device for the trim tabs on boats.

2. Background Art

It is well known by boat owners and operators who have trim tabs on their crafts that they also frequently do not known at any given time what position the trim tabs are in. Currently there are no acceptable commercial products on the market which allow the boat owner or operator to monitor the position of the trim tabs electronically. Operators have burned out pumps or a pump motor because the tabs have been in either a full up or a full down position and the hydraulic actuation system was still functioning. Up to the present time a frequent practice has been to look over the stern to tell where the tabs are.

Another problem is that if the trim tabs are left in the down position then the extended piston rods of the hydraulic cylinders can be corroded. Corrosion of the piston rods will generally result in damage to seals in the cylinders leading to the loss or leakage of hydraulic fluid. Loss of hydraulic fluid again frequently means a burned out or damaged pump, which is expensive to repair or replace. It is recognized as important for the operator of a boat to check the position of the trim tab before shutting the engine down after tying up. It is generally assumed that the operator will move the tabs to the full up position when the boat is tied up but this is not always so.

The only known prior art position monitor has been restricted to a hydraulic pressure gauge which indicates the line pressure between the hydraulic pump and the hydraulic cylinder but does not show trim tab position.

DISCLOSURE OF INVENTION

A trim tab position monitor and readout device which is attached directly to the trim tab controls. The monitor device enables the operator to visually read the position of the tabs as they are moved either by manual or by automatic operation. The monitor device is based on the time required to traverse from full up to full down position and divides the total travel distance into a predetermined number of equal distance segments. Each segment of travel is traversed by the trim tabs in a predetermined period of time depending, of course, on whether the boat is moving and whether the movement is down against water resistance or up with little resistance. The basic circuitry involved is timing the movement of the tabs in order to accurately track trim tab movement and position. The position monitoring of the trim tabs is done entirely electronically requiring no connections or modifications to the controls and actuators for the hydraulic system.

Accordingly, it is among the many features and advantages of this invention to provide a trim tab position monitoring and readout device which is uniquely simple and relatively easy to install. The device is inexpensive and dependable. It tells the operator with its visual readout capability when to take his finger off the control button for the trim tabs. A single glance at the readout indicator tells how far the tabs have advanced at any particular time and tell, the operator accurately where his trim tabs are. There are as a result of the invention fewer burned out pumps and pump motors. The device may tell the operator where the optimum tab position is for a boat's cruising speed. It is both a safety device and an efficiency device from the point of view of boat operation.

BRIEF DESCRIPTION OF THE DRAWINGS

FIG. 1 shows a simple instrument face with two arcuate lines of lights to show the position of the trim tabs;

FIG. 3 is a block functional diagram of the circuits of the device.

BEST MODE FOR CARRYING OUT THE INVENTION

Figure 2:
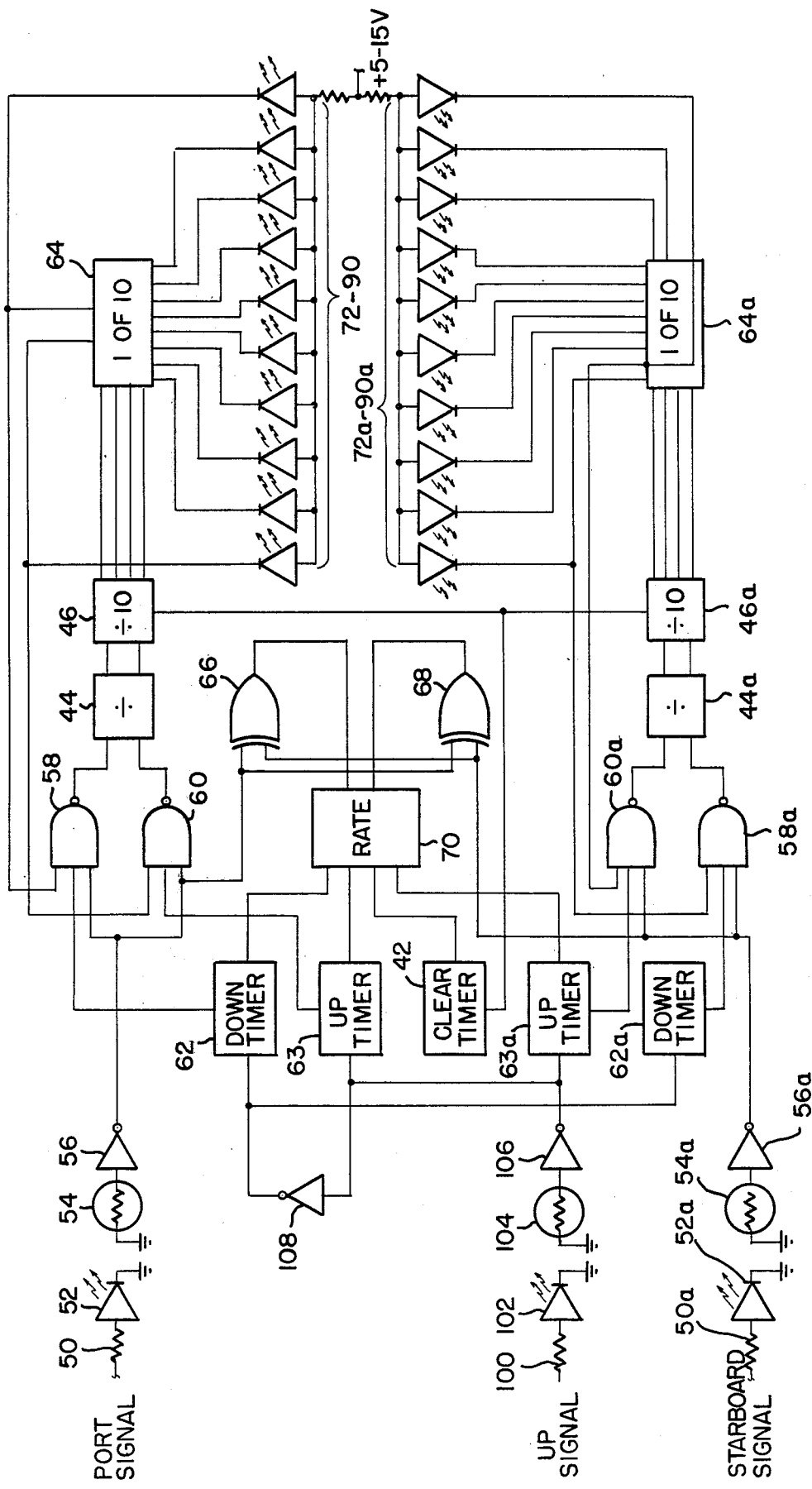
FIG. 2 is an electrical schematic of the circuitry of the invention.

FIG. 1 shows the face of the position monitor panel. The port and starboard tabs each are represented by ten LED's (light emitting diodes) in an arcuate pattern which represent the full distance of travel of the tabs from a full up position at the upper end of the arc to a full down position at the lower end of the arc.

Referring to FIGS. 2 and 3, it will be seen how the circuit monitors the positive voltage output of the manual switch controls for the trim tabs. The device, generally designated by the number 10, has switch inputs 12 and 14 for port or starboard "down" monitoring control and switch 16 for either port or starboard "up" monitoring control. Opto-isolators 52–54, 52a–54a, are used to connect the signals from the boat's trim tab controls which may have varying voltages, for instance 12, 24 or 36 volt systems. When a manual switch 12, 14 or 16 is actuated to move a trim tab up or down there are two positive voltage outputs from the manual control. One output selects the direction the hydraulic pump is to run and the other selects the port or starboard solenoid to open and allow hydraulic fluid to enter or exit the hydraulic cylinder. The up/down select subcircuit 58, 60 signals are also received from up generator 63 and down generator 62 after which the signals are processed through circuit divider 44, 46 and from there to decoder 64 and the 10 arcuate LED display 72 through 90.

It will be understood that the length of time the circuit is engaged determines the amount of travel of a tab. After determining the exact time period required for one or both of the tabs to travel from full up to full down position and from full down to full up positions under load conditions, the period is then divided by 150. 150 represents the total number of electronic pulses required to run the 10 LED monitors in each of the displays which reflect the positions of the tabs.

Thus, when power is turned on to activate the monitor 10, a negative pulse is emitted from monostable system timer 42 as a one shot pulse of 0.5 Hz duration acting as a clear pulse for the up/down counters 44 and 46 setting the counters at zero count which indicate a full up position of the tabs.

When the manual switch 12 is actuated to run the port tab down, a positive output voltage is applied through current limiting resistor 50 to LED 52. The signal turns on LED 52 and also turns on the base of photo transistor 54 sending a ground signal to Schmitt trigger 56. The signal to the Schmitt trigger 56 becomes a high in digital language and is one of three input pulses to NAND gate 58 and 60. The second input to the NAND gate is from astable down timer 62 set to operate at 0.056 Hz as an example. Input three to the NAND gate 58, 60 is from the number 9 output pin on binary decoder or BCD 1 of 10 decoder 64 which is also in the high state. This allows the 0.056 Hz signal from down timer 62 to pass and be counted by a divide by 15 up-/down counter 44 as long as the manual switch remains in the port down position.

The high from Schmitt trigger 56 is also one of two inputs to exclusive OR gate 66 and 68. The second input to both exclusive OR gates 66 and 68 is from the Schmitt trigger 56a which is the starboard signal. If either input to 66 or 68 goes high, the output of the exclusive OR goes high and turns on the enable or analog switch 70 putting a second resistor in parallel with the timing resistor of timers 62 and 63 thus changing the pulse rate to a faster pulse. If both inputs to the exclusive OR gate 66, 68 go high, the output remains low and does not enable the analog switch 70 thus leaving the timers 62 and 63 at the slower pulse rate. This portion of the circuit compensates for the rate of speed the tab travels, depending upon whether one or both tabs are engaged. Since both tabs are run by a common pump, the rate of travel is faster if only one tab is engaged at a time.

The 0.056 Hz pulse is cascaded from divide by 15 counter 44 to a second divide by 10 up/down counter 46 to give a total count capacity of 150 pulses. The BCD output of 46 is applied to decoder 64, a one of 10 decoder which drives LEDs 72 through 90 on the monitor panel, indicating the tab position in 10 equal segments. When a full 150 pulses have been counted, LED 90 is turned on indicating the tab has reached full down travel. The same low output from 64 which turns on the lowest LED 90 is applied to the input of a NAND gate 58 and blocks the pulse from astable timer 62 which stops the count process.

When the manual switch is actuated for a port up operation, positive voltage is applied through current limiting resistors 50 and 100 to LED's 52 and 102. This signal turns on the base of photo transistors 54 and 104 and is then inverted by Schmitt triggers 56 and 106. The high signal at 56 is again fed to the input of gate 58 and 60. The high signal from Schmitt trigger 106 is inverted again by Schmitt trigger 108. This signal, now low, goes to the reset of astable timer 62 stopping the 0.056 Hz pulse output.

The high signal from Schmitt trigger 106 turns on the 0.046 Hz pulse of astable timer 63. This 0.046 Hz pulse is applied to the down count of the first divide by 15 up/down counter 44 and subtracts as long as the manual switch is held in the up position. When counters 46 and 44 have counted back down to number 0, the number zero output pin on 64 goes low which is fed to the third input of NAND gate 60 and stops the passage of the pulse from astable timer 63 thus locking the monitor on LED 72 indicating the tab is all the way up.

I claim:

1. On a boat having stern trim-tab means, power actuator means for said trim tab means and electrical control means for said power actuator means, the improvement of a trim-tab position monitor and display device, comprising:
   a. an enabling circuit means for receiving first, second and third pulses,
   b. coupling circuit means connecting said device to said trim-tab electrical control means, said electrical control means providing first raise or lower trim-tab pulses to said coupling circuit means which in turn is connected to and conducts said first pulses to said enabling circuit means,
   c. timer circuit means connected to said enabling circuit means for generating second timed pulses and conducting the same to said enabling circuit means,
   d. decoder circuit means connected to said enabling circuit means to provide a third enabling pulse to said enabling circuit means,
   e. said enabling circuit means adapted to pass said second pulses to a counter circuit means upon the existence of predetermined conditions in said first, second and third pulses,
   f. counter circuit means connected to said enabling circuit means for accepting said second timed pulses from said enabling circuit means and to count the same,
   g. said decoder circuit means also connected to said counter circuit means for accepting pulses from said counter circuit means for selectively energizing a visual display panel; and
   h. said visual display panel connected to said decoder circuit means and having light emitting diodes in a predetermined display arrangement to indicate the position of said trim tab means between full up and full down positions.

2. The trim tab position monitor and display device of claim 1 and in which said coupling circuit means is an optical coupling circuit.

3. The trim tab position monitor and display device of claim 2 and in which circuit means are provided for changing the rate of said second timed pulses depending upon predetermined conditions with respect to said trim tab means and said power actuator means.

4. The trim tab position monitor and display device of claim 3 and in which said enabling circuit means is a NAND gate circuit for receiving said first, second and third pulses.

5. The trim tab position monitor and display device of claim 4 and in which the light emitting diodes of said visual display panel are arranged in two arcuate displays to represent the position of port and starboard trim tab means.

* * * * *